INVENTOR
LYMAN F. GILBERT
JOHN W. REUM
BY C.E. Bryant
ATTORNEY

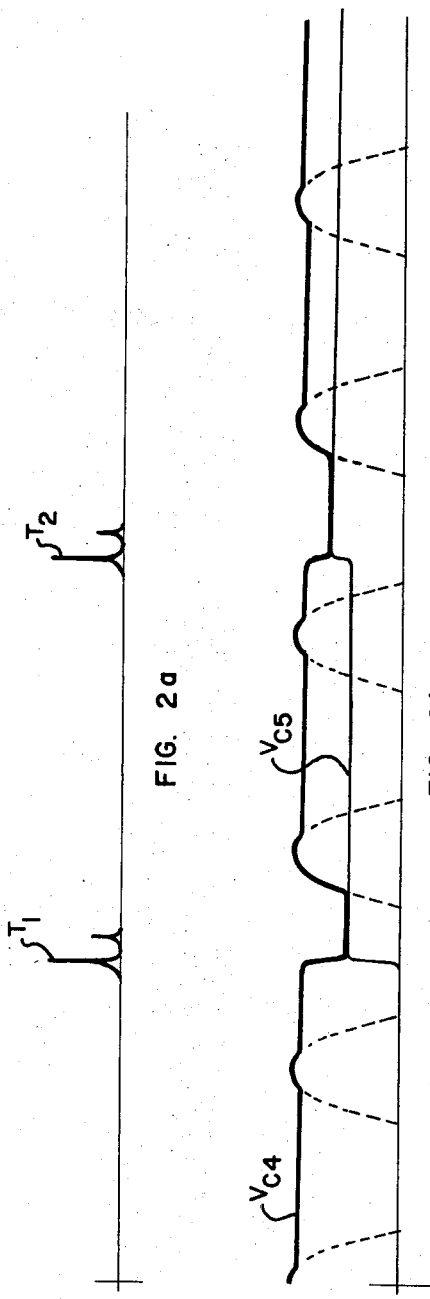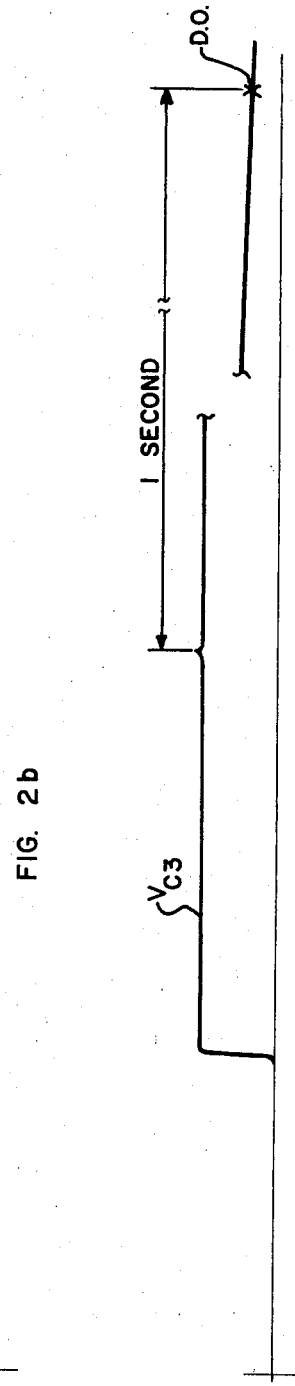

United States Patent Office 3,531,692
Patented Sept. 29, 1970

3,531,692
ACTIVITY DETECTOR HAVING INCREASED ACCURACY OF RESPONSE
Lyman F. Gilbert, Somers, and John W. Reum, Hartford, Conn., assignors to Combustion Engineering, Inc., Windsor, Conn., a corporation of Delaware
Filed Mar. 3, 1969, Ser. No. 803,532
Int. Cl. H01l 47/26
U.S. Cl. 317—132                                      12 Claims

ABSTRACT OF THE DISCLOSURE

In activity detectors, such as an electrical flame detector, a circuit that integrates random signal pulses over a suitable time base and provides a constant time delay responsive to the integrated pulses. The circuit minimizes the effects by noise and false signals on the detectors response.

BACKGROUND OF THE INVENTION

The circuitry of the activity detector of the invention, while described in the embodiment of a flame detector, will find applicability in any area in which detection of subject activity may provide randomly occurring electrical signal pulses as an indication of activity. The property which indicates activity may be movement or radiation, or the like, with the sensor being chosen accordingly, and so long as the sensed signal may take the form of electrical pulses, the activity detector circuitry of the invention will apply.

In environments, such as furnaces, in which it is necessary to continuously monitor and determine the presence or absence of a flame, various types of flame activity detectors are employed. Most detectors use sensors which detect some flame property to produce a signal which may be translated into a form capable of providing a visible or audible indication of flame condition and which may serve some control function associated with flame presence or absence. One common type of detector employs an ultra violet type of sensor. The sensor forms part of a transmitter circuit which generates signal pulses in response to avalanche breakdown within said sensor. Conventionally, these signal pulses are coupled to a receiver wherein they control a current switch, such as a silicon control rectifier (SCR), which in turn controls energization of an output relay.

Various types of sensors are sensitive to activation by sources other than those originating solely with the flame and can produce erroneous "flame" indications when in fact no flame exists. Frequently, the avalanche breakdown will occur in a UV sensing detector from sources other than a flame. These other sources, such as high temperature breakdown, are normally of low frequency and accordingly are usually less than two or three pulses per second. This being the case, the receiver can be designed to provide triggering pulses to the SCR only if the signal pulses are occurring at a rate greater than two or three per second. This may be done by integrating the signal pulses and providing an SCR trigger pulse upon the accumulation of a specified number of signal pulses within a predetermined time period. A signal pulse rate of three per second is considered a safe indication of flame activity, though in fact the rate will normally be much greater.

In the receiver circuits mentioned above, it is common to provide latching means (such as a capacitor shunting the relay coil) for maintaining the relay coil sufficiently energized to "hold in" during the normally brief intervals of SCR non-conduction following commutation off and before the next triggering pulse. Typically, these latching means "hold in" the relay contacts for some milliseconds. However, the delay time to drop out the relay is strongly dependent upon the repetition rate of the sensed pulses that fire the SCR. Certain types of fuels, typically pulverized coal, may have twenty or more pulses per second at one moment and several seconds later only have five pulses per second. A standard capacitive time delay circuit will permit a four to one time delay under these conditions.

Additionally, some circuits operate from half wave power supplies so that pulses may be missed during the negative half cycle for the SCR. The circuit of this invention overcomes the aforementioned objections by providing a constant time delay and providing a partially filtered source of DC so that the SCR can turn on irrespective of the AC line voltage phase angle.

It is desirable that the output relay be energized and remain so for a specific period of time after detection of a flame generated signal pulse. Primarily, this delay prevents dropout when the trigger pulses are occurring at one or two per second. It also prevents the relay from dropping out and providing a "no flame" indication for such brief and transient events as momentary power interruption, momentary decrease in flame intensity, and the like. The desired dropout delay period must be long enough to embrace the integration time base and momentary outrages, but also short enough to permit the relay to drop out and indicate "no flame" before a dangerous condition can arise. Delaying the dropout for about one second or a little less is held to satify these criteria.

SUMMARY OF THE INVENTION

The invention relates generally to activity detectors which provide an "activity" indication in response only to a real "activity" stimulus and which have readout means employing a constant time delay. Particularly, the invention is concerned with the receiver circuit of a flame detector which discriminates between flame generated signals and those from other sources and employs a fixed period time delay in its output relay to hold in said relay for a fixed period after final energizing current is provided to said relay. More particularly, the receiver of the invention employs an SCR current switch which may be fired by trigger pulses occurring at any time, regardless of the phase of the AC supply voltage, and which is commutated off within several milliseconds thereafter. The constant period of relay energization following a trigger pulse is obtained through an RC time delay latching circuit in shunt with said relay and which is so charged by said SCR as to ensure a relatively constant delay period before dropout of said relay. Further, the receiver of this invention is capable of providing trigger pulses only for those signal pulses which are produced as a result of an existing flame through use of an integrating circuit and pulse generator. The activity detector receiver of this invention accomplishes accurate and reliable flame detection with a minimum of component expense.

BRIEF DESCRIPTION OF THE DRAWINGS

FIG. 2a depicts the trigger pulses from the integrating network which fire the SCR of the flame detector;

FIG. 2b, having the same time scale as FIG. 2a, depicts the wave forms of the voltage on the filtering and commutating capacitors in the anode and cathode circuits, respectively, of the SCR; and FIG. 2c depicts the wave form of the voltage on the latching capacitor.

DESCRIPTION OF THE PREFERRED EMBODIMENT

Figure 1:
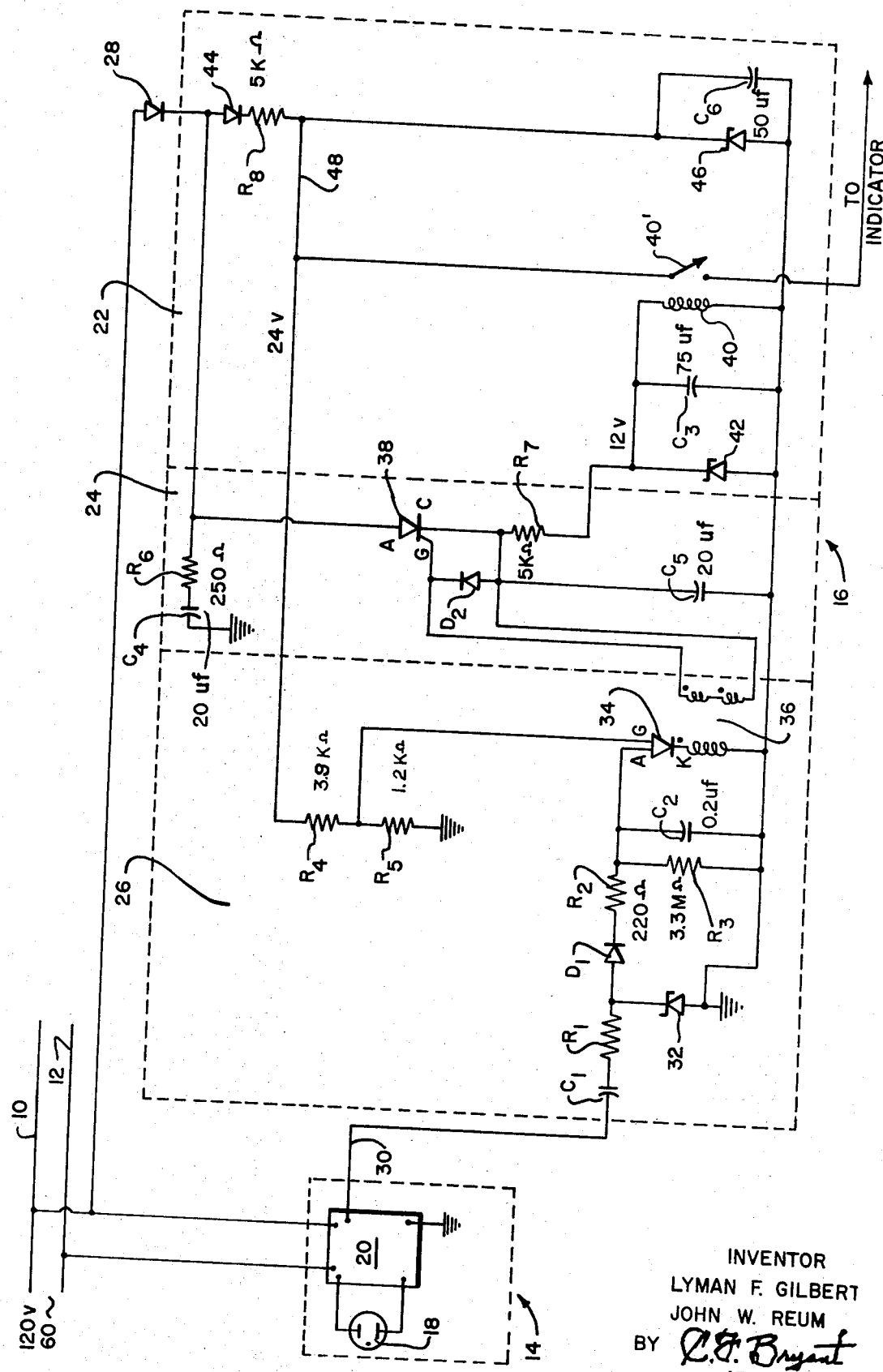
FIG. 1 is a circuit diagram of the present invention.

Referring to the circuit diagram of FIG. 1 there is provided a source of AC potential on lines 10 and 12 which is conveniently 120 volts r.m.s. and 60 cycles per second. The AC supply is connected to the transmitter 14 and receiver 16 portions of a flame detector. Transmitter 14 may be any of a class of well-known circuits containing a sensor 18 and signal pulse generator 20. A flame sensor and transmitter of this general type is described in U.S. Pat. No. 3,286,093, issued on Nov. 15, 1966 to L. F. Gilbert. Any transmitter circuit capable of sensing subject activity and producing signal pulses in response thereto may serve as a signal source for the receiver of the invention, however, transmitter 14, which has a UV sensitive breakdown sensor 18 coupled with a signal pulse generator 20 to produce signal pulses in response to breakdown of sensor 18, is used in the preferred embodiment. A signal transmitter of this type will provide a stream of signal pulses when UV sensor 18 is detecting flame generated UV energy. In certain instances in which no flame is present, other UV sources or background noise may cause occasional breakdown of sensor 18, thereby causing "false" signal pulses to be generated by transmitter 14. However, these pulses will occur at a repetition rate of less than two or three per second, far less than that of flame generated signal pulses. An integrating network is provided in receiver 16 to produce trigger pulses only if the signal pulses are occurring at a frequency greater than some predetermined rate, thereby preventing non-flame generated signal pulses from actuating the output circuitry of the receiver.

Flame detector receiver 16 includes the constant time delay output section 22, the SCR firing circuitry 24, and the signal pulse frequency discriminator 26. Diode 28 is in series with receiver 16 across the AC supply and provides an unidirectional current path to the receiver. Signal pulses from transmitter 14 are connected with receiver 16 by means of conductor 30. The signal pulses from transmitter 14 will be fairly uniform and narrow in width and of a voltage greater than 30 volts. The signal pulses are coupled with the receiver circuit through capacitor $C_1$ and current limiting resistor $R_1$. A voltage regulating diode, such as Zener diode 32, is connected between $R_1$ and ground to limit the pulse voltage to the circuitry which follows. Diode $D_1$ has its anode connected with the junction of resistor $R_1$ and Zener diode 32 to pass the pulses from transmitter 14 to the integrating network. Diode $D_1$ blocks reverse leakage current flow from the integrating network which includes resistor $R_2$, resistor $R_3$, and capacitor $C_2$. The integrating network is in turn connected to the anode of a programable unijunction transistor (PUT 34). The primary winding of a pulse transformer 36 is connected between the cathode of PUT 34 and ground. A preselected voltage is applied to the gate of PUT 34 by means of a voltage divider comprised of resistors $R_4$ and $R_5$.

Each time a signal pulse is passed by diode $D_1$ it will increase the charge on capacitor $C_2$, the magnitude of which is determined by resistor $R_2$, capacitor $C_2$ and the pulse width. Resistor $R_3$, which shunts capacitor $C_2$, has a large resistance and provides a timed discharge path for the charge on capacitor $C_2$. The voltage at the gate of PUT 34 will determine the anode voltage necessary to effect conduction by PUT 34. If successive signal pulses occur at a rate that will charge capacitor $C_2$ more rapidly than it discharges through resistor $R_3$, the net charge on capacitor $C_2$ will increase. When the charge on capacitor $C_2$ reaches the conduction threshold level of PUT 34 as determined by the gate voltage, conduction through PUT 34 will occur. The charge on capacitor $C_2$ provides a current source for the primary of pulse transformer 36. Capacitor $C_2$ will discharge quickly, thereby providing a trigger pulse across the transformer primary. The trigger pulse thus developed is coupled to the SCR firing circuitry 24 through the secondary of pulse transformer 36.

Once a particular signal pulse repetition rate is selected which distinguishes between flame generated signal pulses and those caused by other sources, the integrating network and the PUT 34 gate voltage may be designed to effect firing of PUT 34 in response to said particular signal pulse repetition rate. In this instance, the anode of PUT 34 will receive an enabling voltage and will fire for every third signal pulse occurring in a duration of one second or less. Under normal "flame on" conditions, signal pulses will occur at a frequency much higher than three per second and accordingly, the number of trigger pulses generated by the PUT 34 within any one second will be one-third the number of signal pulses occurring within that one second. Therefore the integrator essentially divides by three.

The secondary of transformer 36 couples the trigger pulses produced by PUT 34 to the SCR firing circuit 24. The transformer secondary is connected between the cathode C and gate G electrodes of the current switch, silicon control rectifier 38. A diode $D_2$ is connected in parallel with the transformer secondary to permit only positive pulses to appear at the gate of SCR 38.

SCR 38 serves as a current switch in series with the coil of output relay 40 which is connected to the voltage source. The SCR firing circuitry 24 allows trigger pulses to fire SCR 38 at any time the trigger pulses occur, regardless of the phase of the AC supply voltage at that instant. SCR 38 is then commutated off in a manner which is relatively independent of the phase of the AC supply voltage. The design of the SCR firing circuit 24 ensures complete charging of capacitor $C_3$ to a voltage determined by a Zener diode 42 and then commutates the SCR off within several milliseconds thereafter thereby enabling the relay dropout delay time to be essentially constant.

The output section 22 includes circuitry for providing a regulated voltage supply to the relay contacts and other portions of the system. More importantly, it includes part of the circuitry which maintains "hold in" of the relay contact 40' for the desired delay period after cessation of current conduction by SCR 38. Typically, the load relay 40 may be a reed relay which experiences "pull in" at one voltage (8–10 v.) and will "dropout" at a lower voltage (3–4 v.). Holding capacitor $C_3$ is connected across the coil of relay 40 and is of a value which, when charged to a predetermined voltage, will maintain "hold in" of relay 40 for a fixed period of time after cessation of external current supply. In the preferred embodiment, a Zener regulated voltage initiates and maintains "hold in" of relay 40.

In order to better understand how capacitor $C_3$ is charged to the desired voltage level for each trigger pulse and how the relay "drop-out" time delay effected by said capacitor and capacitor $C_5$ is substantially constant with respect to the occurrance of a trigger pulse, a more thorough discussion of the SCR firing circuit 34 will be undertaken. Diode 28 is in series with SCR 38 and the load relay 40 across the AC source. Diode 28 conducts on the positive half cycles of AC voltage. This arrangement would normally permit firing of SCR 38 only during the positive half cycles of the AC source. Further, SCR 38 would normally commutate off when the current through SCR 38 drops below its holding current level. However, in order to permit "pull in" of relay 40 and complete charging of capacitor $C_3$ any time a trigger pulse occurs, it is necessary to provide a source of DC voltage to permit firing of SCR 38 at any phase angle of the AC source. It is then necessary to have the SCR 38 cease conduction or commutate off as soon as the voltage on $C_4$ and $C_5$ becomes nearly equal.

So that SCR 38 may be fired at any time, an enabling voltage is maintained at its anode during all phases of the AC source. This is accomplished by the filter network of capacitor $C_4$ and resistor $R_6$ in series and connected between the cathode of diode 28 and ground. During the first half of the positive half cycle (first quadrant) of the AC source voltage capacitor $C_4$ will charge to the peak voltage of the AC source (about 160 volts). The voltage on the anode of diode 28 will then begin decreasing. However, because the voltage on capacitor $C_4$, and accordingly the cathode of diode 28, is at that instant equal to or more positive than the voltage on the anode of diode 28, the diode will be back biased, thereby blocking further current conduction. For the remainder of the positive half cycle (second quadrant) and the full negative half cycle (third and fourth quadrants) of the AC source, capacitor $C_4$ will hold the peak voltage on the anode of SCR 38. If a trigger pulse should occur during the second, third, or fourth quadrants, the SCR will conduct until the voltage on $C_4$ and $C_5$ equalizes. As the anode voltage on diode 28 goes positive in the first quadrant of the next cycle of the AC source, it will reach a point at which it is more positive than the votage on the partially discharged capacitor $C_4$ and current conduction through diode 28 will occur. This will again charge capacitor $C_4$ to the peak voltage and back-bias diode 28. Thus the RC network of capacitor $C_4$ and Resistor $R_6$ filter the half wave rectified supply voltage to provide a continuous enabling potential to the anode of SCR 38.

Upon receipt of a trigger pulse at its gate, SCR 38 will fire and begin conduction. Once the SCR has been triggered into conduction, the gate loses further control and conduction will cease only when the current drops below the SCR's holding current (about five milliampere). Normally the SCR is commutated off as the AC supply voltage enters the negative half cycle and the potential across the anode and cathode becomes zero. However, in the SCR firing circuitry of the activity detector of the invention, commutation of SCR 38 is effected by capacitors $C_4$ and $C_5$. The conduction cycle of SCR 38 and its effect on the constant time delay circuitry associated with relay 40 will be understood more clearly by reference to the wave forms of FIGS. 2a, 2b, and 2c.

The pulse wave forms of FIG. 2a represent those positive trigger pulses appearing at the secondary of pulse transformer 36, and accordingly, at the gate of SCR 38. The smaller amplitude pulses immediately adjacent the larger trigger pulses occur as a result of ringing in pulse transformer 36. Diode $D_2$ prevents negative pulses on the transformer from appearing at the gate of SCR 38. The integrating network and the firing level of PUT 34 may be designed to provide any desired frequency relationship between the signal pulses and the trigger pulses.

Voltage wave form $V_{C4}$ in FIG. 2b represents the voltage at the junction between capacitor $C_4$ and resistor $R_6$ at the various times during conduction and non-conduction of diode 28 and SCR 38. Voltage wave form $V_{C5}$ represents the voltage at the junction of capacitor $C_5$ and the cathode of SCR 38. The broken line wave form of FIG. 2b represents the voltage which would appear at the anode of SCR 38 due to the half wave rectification of diode 28 were it not for the presence of the filtering network of capacitor $C_4$ and resistor $R_6$. The voltage of wave form $V_{C4}$, prior to the occurrence of trigger pulse $T_1$, is about 160 volts. At the instant that trigger pulse $T_1$ occurred, the AC supply voltage was negative with respect to ground. Diode 28 was back biased and the only enabling power source for firing of SCR 38 was the energy stored in capacitor $C_4$. The voltage on the anode of SCR 38 will be about 160 volts and the voltage on the cathode in this instance, though not always, will be at ground. Thus, the trigger pulse $T_1$ occurring at this time will be effective in firing SCR 38 and causing conduction therethrough. At the instant SCR 38 begins to conduct, capacitor $C_4$ will begin to rapidly discharge through the low impedance path of resistor $R_6$ and SCR 38 and provides charging current to capacitor $C_5$ as well as to the parallel branch which includes resistor $R_7$ in series with the parallel network of Zener diode 42, capacitor $C_3$, and the coil of relay 40. Capacitor $C_5$ will charge rapidly and within several milliseconds will reach the voltage to which capacitor $C_4$ has now discharged. As the charge voltages on capacitor $C_4$ and capacitor $C_5$ approach one another, the current through resistor $R_6$ and SCR 38 drops rapidly and as the voltage on the two capacitors becomes equal, SCR 38 will commutate off and return to its high impedance state.

During the several milliseconds that capacitor $C_5$ is charging capacitor $C_3$ is charging to the voltage determined by the voltage regulating Zener diode 42. The remaining voltage will be dropped across resistor $R_7$. When the voltage across the coil of relay 40 reaches the "pull in" point the normally open switch contact 40' closes.

The wave form of FIG. 2c is representative of the charge voltage on capacitor $C_3$, and accordingly, the potential across the coil of relay 40. As SCR 38 begins to conduct, the voltage on capacitor $C_3$ rapidly goes from zero to the Zener regulated voltage level and remains at that level while SCR 38 is conducting and for the period of time thereafter that the voltage on capacitor $C_5$ remains above the Zener 42 voltage level. When SCR 38 ceases conduction, capacitor $C_5$ will discharge through resistor $R_7$ and the delay circuitry of section 22.

FIG. 2a depicts a second trigger pulse $T_2$ occurring about 30 milliseconds after trigger pulse $T_1$. In the interval of time between pulses $T_1$ and $T_2$ the following will occur. SCR 38 will fire and be commutated off in a period of several milliseconds. When SCR 38 turns off, capacitor $C_5$ will slowly discharge ($V_{C5}$) and will continue until the SCR is again triggered into conduction. Capacitor $C_4$ will slowly discharge ($V_{C4}$) until the point in the first quadrant of the next cycle of the AC supply at which the anode of diode 28 becomes more positive than the charge on capacitor $C_4$. At this point conduction resumes through diode 28 to recharge capacitor $C_4$ to the peak voltage. The filtering of the supply voltage afforded by capacitor $C_4$ is then resumed. The voltage on capacitor $C_3$ in the delay network will remain at the Zener 42 voltage until capacitor $C_5$ discharges to that voltage.

Trigger pulse $T_2$ is here seen to occur at the beginning of the third quadrant of the AC supply phase, but in fact might occur at any time. Again, SCR 38 will be fired and begin conduction. The voltage on capacitor $C_4$ ($V_{C4}$) drops rapidly and capacitor $C_5$ rapidly charges ($V_{C5}$). SCR 38 is again commutated off when the voltage on capacitor $C_5$ equals that of capacitor $C_4$. In this instance capacitor $C_5$ will have been partially charged before conduction began and commutation of the SCR will occur somewhat more quickly and at a somewhat higher capacitor voltage. hTe voltage on capacitor $C_3$ will remain at the Zener 42 voltage as long as capacitor $C_5$ is charged above that level. Following trigger pulse $T_2$ it is presumed that flame failure occurs and no trigger pulses occur for at least one second. After the last trigger pulse $T_2$ occurs, capacitors $C_5$ and $C_3$ will begin to discharge. After a specified time of one second, the voltage across capacitor $C_3$ and relay 40 decreases (FIG. 2c) to the relay "dropout" (D.O.) voltage.

The delay time results from the discharge time constants for capacitors $C_5$ and $C_3$ in their respective discharge paths. Capacitor $C_5$ will initialy discharge through resistor $R_7$ until reacting the Zener 42 voltage. Then, $C_5$ will discharge through $R_7$ and the resistance of relay 40 and capacitor $C_3$ will discharge through the resistance of relay 40. The delay time may easily be varied by changing the values of the capacitors, the resistances, and/or the charge voltages, to obtain the desired constant dropout delay. This system permits a relay "dropout" delay time which is substantially constant, regardless of the phase of the AC supply voltage when the last trigger pulse was received. Though the delay effected by the discharge of capacitor $C_5$ may vary slightly depending on the extent to which the capacitor is charged, this variation will be less than .1 second.

It will be noted that SCR 38 will fire upon receiving a trigger pulse at its gate electrode and will commutate off within a few milliseconds thereafter if conduction was initiated during the second, third, or fourth quadrants of the AC supply cycle; however, if the SCR fires during the first quadrant and diode 28 is forward biased prior to commutation off by capacitor $C_5$, the diode 28 and SCR 38 will continue to conduct until capacitor $C_5$ is charged to the peak supply voltage. At the peak supply voltage $C_4$ and $C_5$ will have equal voltages and the SCR will commutate off. Though this conduction cycle of SCR 38 varies slightly from that discussed for trigger pulses occurring in the other three quadrants, its period of conduction will still be only three or four milliseconds.

The series arm including diode 44, current limiting resistor $R_8$, and 24 volt Zener diode 46 is connected between the cathode of diode 28 and ground to provide a regulated voltage source across Zener diode 46. This regulated voltage source provides an operating potential for the $R_4$–$R_5$ voltage divider and for the output indicating device (not shown) as controlled by relay switch contact 40'. Capacitor $C_6$ is connected in parallel with Zener diode 46 and aids in maintaining the regulated voltage supply during the intervals when diode 44 is not conducting.

The output indicator (not shown), which is connected to the regulated voltage line 48 through relay switch contact 40', may be any type of device capable of providing an audible or visible indication of flame presence or absence. Also, various control functions may be performed through switching of the relay switch contact 40'.

While we have illustrated and described a preferred embodiment of the invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of the invention.

What we claim is:

1. In an activity detector having means which sense a phenomenon indicative of activity in a manner resulting in the production of recurring electrical signal pulses which actuate circuitry controlling energization of an activity indicating load, the improvement comprising in combination; integrating means having said electrical signal pulses coupled to its input; load means in series with a controlled rectifier; means to connect a source of potential across said load means and controlled rectifier; means for maintaining a substantially constant enabling voltage on the anode of said controlled rectifier during its high impedance state; triggering means connected intermediate the output of said integrating means and the control electrode of said controlled rectifier for providing a triggering potential to said controlled rectifier each time a predetermined voltage appears at the output of said integrating means; and delay means of the charge storage type connected in series with said controlled rectifier and operatively connected with said load means for first charging to a voltage effecting commutation of said controlled rectifier and thereafter discharging through said load means for maintaining said load means energized for a predetermined, substantially constant period of time.

2. A flame detector comprising in combination: means for providing recurring electrical signal pulses in response to detection of a phenomenon present in a flame; integrating means coupled to said electrical signal pulses; load means in series with a controlled rectifier; means to connect an alternating current source across said load means and controlled rectifier; means for maintaining a substantially constant enabling voltage on the anode of said controlled rectifier during its high impedance state; triggering means connected intermediate the output of said integrating means and the control electrode of said controlled rectifier for providing a triggering potential to said controlled rectifier each time a predetermined voltage appears at the output of said integrating means; and delay means of the charge storage type connected in series with said controlled rectifier and operatively connected across said load means for first charging to a voltage effecting commutation of said controlled rectifier and thereafter discharging through said load means for maintaining said load means energized for a predetermined, substantially constant period of time.

3. The apparatus of claim 2 wherein the means for maintaining a substantially constant enabling voltage on the anode of said controlled rectifier during its high impedance state include unidirectional conducting means connected intermediate said source of potential and said anode and filter means connected across said controlled rectifier and load means for providing a filtered DC voltage.

4. The apparatus of claim 2 wherein said delay means include first capacitance means connected in parallel with said load means and with voltage limiting means for charging to a first limited voltage and second capacitance means for charging to a second higher voltage effecting commutation of said controlled rectifier, said first and second capacitance means thereafter discharging through said load means.

5. The apparatus of claim 3 wherein said delay means include first capacitance means connected in parallel with said load means and with voltage limiting means for charging to a first limited voltage and second capacitance means for charging to a second higher voltage effecting commutation of said controlled rectifier, said first and second capacitance means thereafter discharging through said load means.

6. The apparatus of claim 2 wherein said integrating means effect integration of said signal pulses over a fixed time base and the delay period effected by said delay means is as long as said fixed time base.

7. The apparatus of claim 5 wherein said integrating means effect integration of said signal pulses over a fixed time base and the delay period effected by said delay means is as long as said fixed time base.

8. The apparatus of claim 2 wherein said triggering means include a programable unijunction transistor and pulse transformer in series and connected across the output of said integrating means; said unijunction transistor being programmed to fire each time said predetermined potential appears at the output of said integrating means and the resultant pulses across said pulse transformer are coupled to the control electrode of said controlled rectifier.

9. The apparatus of claim 7 wherein said triggering means include a programable unijunction transistor and pulse transformer in series and connected across the output of said integrating means; said unijunction transistor being programmed to fire each time said predetermined potential appears at the output of said integrating means and the resultant pulses across said pulse transformer are coupled to the control electrode of said controlled rectifier.

10. The apparatus of claim 9 wherein said controlled rectifier is a silicon controlled rectifier and said load means is a flame relay.

11. The apparatus of claim 1 wherein said delay means include first capacitance means connected in parallel with said load means and with voltage limiting means for charging to a first limited voltage and second capacitance means having resistive impedance means and said first capacitance means connected thereacross for charging to a second higher voltage effecting commutation of said controlled rectifier, said first and second capacitance means discharging thereafter through said load means.

12. The apparatus of claim 11 wherein said integrating means effect integration of said signal pulses over a fixed time base and the delay period effected by said delay means is as long as said fixed time base and said triggering means include a programable unijunction transistor and pulse transformer in series and connected across the output of said integrating means; said unijunction transistor being programmed to fire each time said predetermined potential appears at the output of said integrating means and the resultant pulses across said pulse transformer are coupled to the control electrode of said controlled rectifier.

References Cited

UNITED STATES PATENTS

| | | | |
|---|---|---|---|
| 3,262,017 | 7/1966 | Ashenden et al. | 317—33 |
| 3,437,884 | 4/1969 | Mandock et al. | 317—148.5 |

J. D. MILLER, Primary Examiner

H. E. MOOSE, Assistant Examiner

U.S. Cl. X.R.

317—147; 340—228.2